United States Patent [19]
Erwin et al.

[11] Patent Number: 5,665,284
[45] Date of Patent: Sep. 9, 1997

[54] PROCESS FOR MANUFACTURING FOAM-FILLED EXTRUDED PRODUCTS

[75] Inventors: Ronald Dean Erwin, Peachtree City; Marvin Ray Whitley, Norcross, both of Ga.

[73] Assignee: Ronald D. Erwin, Peachtree City, Ga.

[21] Appl. No.: 427,892

[22] Filed: Apr. 26, 1995

[51] Int. Cl.⁶ .................... B29C 44/06; B29C 44/14
[52] U.S. Cl. .................. 264/40.7; 264/45.9; 264/46.6; 264/150; 264/151
[58] Field of Search .................... 264/46.9, 45.1, 264/46.6, 45.9, 150, 151, 40.7

[56] References Cited

U.S. PATENT DOCUMENTS

| | | | |
|---|---|---|---|
| 3,411,981 | 11/1968 | Thomas | 264/46.9 |
| 3,778,528 | 12/1973 | Heifetz et al. | 174/48 |
| 3,947,175 | 3/1976 | Melcher | 264/45.1 |
| 4,221,624 | 9/1980 | Eslinger et al. | 264/45.9 |
| 4,305,238 | 12/1981 | Harward et al. | |
| 4,433,519 | 2/1984 | Jenkins | |
| 4,546,899 | 10/1985 | Williams | 264/46.6 |
| 4,595,709 | 6/1986 | Reischl | 264/45.9 |
| 4,834,585 | 5/1989 | Hasenwinkle | |
| 4,976,063 | 12/1990 | Young | |
| 5,092,076 | 3/1992 | Terreta | |
| 5,142,818 | 9/1992 | Weigert | |
| 5,253,458 | 10/1993 | Christian | |
| 5,271,878 | 12/1993 | Mizia et al. | |
| 5,328,651 | 7/1994 | Gallagher et al. | 264/45.9 |
| 5,360,295 | 11/1994 | Isacksen | |
| 5,366,674 | 11/1994 | Hattori et al. | 264/46.6 |
| 5,367,822 | 11/1994 | Beckham | |

FOREIGN PATENT DOCUMENTS

| | | | |
|---|---|---|---|
| 2544793 | 4/1977 | Germany | 264/45.9 |
| 281333 | 11/1978 | Germany | 264/45.9 |
| 48-4473 | 2/1973 | Japan | 264/45.9 |
| 59-176028 | 10/1984 | Japan | 264/46.4 |

Primary Examiner—Allan R. Kuhns
Attorney, Agent, or Firm—Arthur A. Gardner

[57] ABSTRACT

A process for fabricating an article having a rigid foam core and a resilient outer plastic shell by extruding heated thermoplastic material to form the shell, partially hardening the extruded a plastic shell, injecting a liquid foam material into the interior of the partially hardened plastic shell, and cooling the shell and the liquid foam material to fully harden the plastic shell and the foam under conditions which cause the article to have a predetermined shape and size.

7 Claims, 1 Drawing Sheet

PROCESS FOR MANUFACTURING FOAM-FILLED EXTRUDED PRODUCTS

TECHNICAL FIELD

The present invention is directed to a process for manufacturing foam-filled plastic extruded products.

BACKGROUND OF THE INVENTION

Traditionally, wood products have been a primary source of materials for use in construction. However, wood products are becoming increasingly scarce due to the harvesting of trees at ever faster rates and the rather limited rate at which timber resources can be replenished. Also, environmental concerns and environmental regulations directed to conservation or preservation of forests tend to restrict the availability of wood products. With diminishing availability of timber resources, wood products are becoming increasingly expensive. There is, therefore, a substantial need for long-lasting substitute construction materials that can lessen the need to harvest timber resources.

One approach to addressing the above need is to provide a substitute replacement product made of plastic, rather than wood. However, the replacement or substitute product needs to be stable, rigid, and relatively inexpensive. It also needs to be easily fabricated and used in the field.

U.S. Pat. No. 5,253,458 describes a simulated log made from a cast polyvinylchloride (PVC) pipe, selectively filled with a hard cast foam or a bead type foam. Said patent further describes that the cast PVC pipe is first manufactured and then subsequently filled with the foam filler. This type of manufacturing tends to require excessive numbers of manufacturing operations, and at substantial cost.

Accordingly, it can be seen that there is yet a need in the art for a process of manufacturing foam-filled extruded plastic products, such as a replacement for traditional wood products, wherein the process should provide a strong finished product at minimal cost and with a minimal number of manufacturing steps. It is to the provision of such a process that the present invention is primarily directed.

SUMMARY OF THE INVENTION

Briefly described, in a preferred form the present invention comprises a process for fabricating an article comprised of an inner rigid foam core and an outer resilient plastic shell, with the article having a predetermined size and shape. The method comprises the steps of extruding a thermoplastic material and, during the extrusion, injecting a liquid foam material into the interior of the extruded thermoplastic material so that the extruded plastic shell and the expanded liquid foam core are made together at the same time, thereby minimizing the number of manufacturing steps and the attendant cost. This also tends to promote a very strong bond between the foam core and the extruded plastic shell, thereby increasing the structural rigidity of the resulting foam-filled extruded plastic product. This integrated process for manufacturing the foam-filled extruded product also tends to minimize the cost of manufacturing the product.

In another preferred form the invention comprises a process for fabricating an article comprised of an inner rigid foam core and an outer resilient plastic shell, with the article having a predetermined size and shape. The process includes the steps of extruding a thermoplastic material, initially hardening the thermoplastic material to a certain extent, injecting a liquid foam material into the initially hardened plastic material, further hardening the plastic material to obtain the predetermined size and shape, and cutting the article to a desired length.

Accordingly, it is a primary object of the present invention to provide a process for manufacturing a foam-filled extruded product which is economical in application, reliable, and simple.

It is another object of the present invention to provide a process for manufacturing a foam-filled extruded product which results in even distribution of the foam within the interior of the extruded product.

It is another object of the present invention to provide a process for manufacturing a foam-filled extruded product which results in a strong bond between the extruded shell and the foam core.

These and other objects, advantages, and features of the invention will become more apparent upon reading the following specifications in conjunction with the accompanying drawing figure.

BRIEF DESCRIPTION OF THE DRAWING FIGURE

FIG. 1 is a schematic diagram of a system for carrying out the process for manufacturing a foam-filled extruded product according to a preferred form of the invention and showing various mechanical and electrical components for use therein in schematic form.

DETAILED DESCRIPTION OF THE PREFERRED EMBODIMENTS

Figure 1:
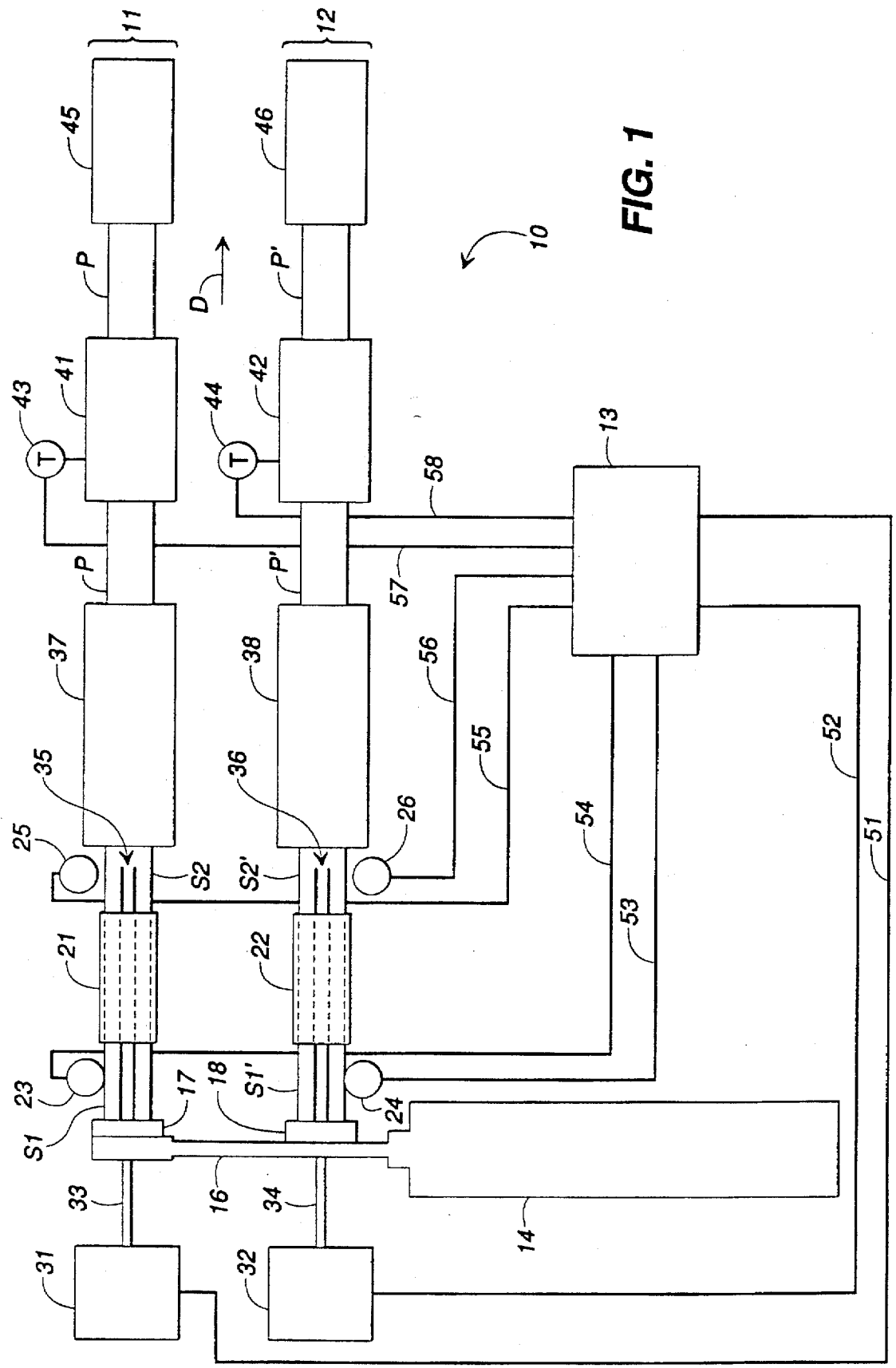

Referring now in detail to the drawing figure, in which like reference numerals represent like parts, FIG. 1 shows a manufacturing system 10 for carrying out the process according to the invention. Manufacturing system 10 includes first and second extrusion lines 11 and 12, with two (2) lines shown for illustration purposes. Of course, those skilled in the art will readily recognize that only one extrusion line could be employed or that more than two extrusion lines could be employed, as desired. The extrusion lines 11 and 12 are each controlled by a common electronic controller 13. The electronic controller can take any of several known forms, such as a programmable logic controller (PLC) or a personal computer adapted for such application.

A common extruder 14 feeds both extrusion lines 11 and 12. The extruder can be of any number of known types, but typically includes an internal auger (not shown) for metering and pumping plastic pellets or powders and a heating element for heating the plastic pellets or powders to melt them to provide a heated thermoplastic discharge suitable for use in the extrusion lines. Moreover, as those skilled in the art will also understand, the extruder 14 typically is fed by known metering or blending equipment for providing a desired controlled quantity of plastic pellets to the extruder and/or for maintaining a preset recipe of plastic pellets or powder to provide a desired composition of the plastic to be extruded. The extruder output is heated thermoplastic which is forced through a "Y-block" or divider 16 for providing equal flows of plastic to first and second crosshead dies 17 and 18. These crosshead dies 17 and 18 are somewhat similar in construction and operation to those used to coat electric wire with an outer plastic insulation sheath. Each of the crosshead dies 17 and 18 includes an internal (unshown) mandrel or core element, which together with the outer (interior) surface of the crosshead die operate to define the shape and wall thickness of the extruded plastic product discharged from the crosshead dies.

Initial sizing and cooling sleeves 21 and 22 are positioned to receive the extruded product from the crosshead dies 17 and 18. These initial sizing and cooling sleeves 21 and 22 are conventional vacuum units. These initial sizing and cooling sleeves provide a rough initial shape and some initial cooling to stabilize the extruded plastic shell. The extruded plastic shell is indicated at S1 and S1' in FIG. 1. As depicted in the figure, the initial sizing and cooling sleeves 21 and 22 are spaced a short distance from the crosshead dies 17 and 18 to expose this section of the outer shell S1 and S1'. This then allows sensors to be positioned adjacent the outer shells S1 and S1' to detect any interruption in the extrusion of the outer shells. Such sensors are depicted at 23 and 24 in FIG. 1 and can take any number of known forms. For example, a photo emitter and a photo detector can be used to detect when there is a break in the extrusion. Alternatively, a motion sensor or proximity sensor can be used.

Another pair of similar sensors 25 and 26 are positioned downstream (after) the initial sizing and cooling sleeves 21 and 22. These second sensors 25 and 26 also operate to detect a break in the outer shell of the extrusion.

A pair of foam mixing and metering devices 31 and 32 pump metered quantities of liquid foam at controllable pressures through liquid foam supply conduits 33 and 34, preferably at room temperature. These liquid foam supply conduits 33 and 34 extend through the crosshead dies 17 and 18 and through the initial sizing and cooling sleeves 21 and 22. The open (discharge) ends 35 and 36 are positioned downstream of the initial sizing and cooling sleeves 21 and 22. Thus, the liquid foam is pumped and metered from the foam mixing and metering devices 31 and 32 through the crosshead dies 17 and 18 and through the initial cooling and sizing sleeves 21 and 22 and into the interior of the initially cooled and sized outer shells S2 and S2'.

Secondary sizing and cooling sleeves or tanks 37 and 38 are positioned downstream from the open discharge ends 35 and 36 of the liquid foam supply conduits 33 and 34. The open ends of liquid foam supply conduits 33 and 34 are positioned approximately 6" to 12" from the secondary sizing and cooling tanks 37 and 38 so that the liquid foam is allowed to drop away from the extrusion lines in the event that a break occurs. In this way, the secondary sizing and cooling sleeves 37 and 38 receive the extruded outer shells S2 and S2' (which have been initially cooled and sized), now filled with expanding or expanded foam. The secondary sizing and cooling tanks provide the foaming and cross-linking reactions and cool the overall article, thereby causing the foam to solidify and the article to take the desired shape. These secondary sizing and cooling sleeves or tanks 37 and 38 further define the exterior dimensions and shape of the outer shell S2 and S2', with the discharge from these sleeves or tanks being a finished extruded product P and P'. The secondary sizing and cooling sleeves or tanks 37 and 38 are rather long in comparison to the initial sizing and cooling sleeves 21 and 22 and utilize a water jacket or water film to minimize the friction between the shell S2 and S2' and the secondary sizing and cooling sleeves 37 and 38. The water film or jacket also helps to cool the outer shells S2 and S2' (and the liquid foam contained therein, now rapidly cooling and hardening to form a rigid structure). The water is preferably at a temperature of approximately 60° F. and the foam expands and sets within 30 to 45 seconds. The water also helps tend to avoid marring the external finish of the outer shells of the product P and P'. Furthermore, the secondary sizing and cooling sleeves are preferably coated with chrome or Teflon® to further reduce friction. The initial sizing and cooling sleeves 21 and 22 may also be coated with chrome or Teflon® if desired. The use of water jacketed sizing and cooling sleeves is known in the art in connection with very large diameter extrusions, such as 36-inch diameter plastic pipe. However, the use of such a water-jacketed sleeve in connection with small diameter extrusions (on the order of 12 inches or less) has not been known by the applicants heretofore. Nor have the applicants been aware of the use of both an initial sizing and cooling sleeve (21 and 22) together with a secondary sizing and cooling sleeve (37 and 38).

Pullers 41 and 42 operate to pull the extruded product P and P' along the extrusion lines 11 and 12. These pullers are of conventional design and include, for example, endless tracks which engage the outer surface of the extruded product for pulling the extruded product in a downstream direction (indicated by arrow D). Each of these pullers has associated therewith a torque sensor 43, 44 for monitoring the torque of the puller being applied to the product P and P'. If the torque exerted by the pullers 41 or 42 suddenly drops to zero or near zero, this is an indication that a break has occurred in the extrusion.

The product P and P' is further conveyed by the pullers 41 and 42 to a saw or other cut off device 45, 46 for cutting the extruded product P, P' into pieces of a predetermined or desired length.

Electrical cabling 51–58 connects the controller 13 with the foam mixing and metering devices 31 and 32 and with the sensors 23 and 24, 25 and 26, and 43 and 44.

In operation, liquid foam is pumped from the liquid foam mixing and metering devices 31 and 32 through the conduits 33 and 34 through the crosshead dies 17 and 18 and ultimately discharges at the discharge ends 35 and 36 into the interior of the semi-cooled outer shells S2 and S2'. This takes place at the same time as the extrusion of the outer shells by the crosshead dies 17 and 18, the initial sizing and cooling sleeves 21 and 22, and the secondary sizing and cooling sleeves 37 and 38. This simultaneous injection of the liquid foam into the interior of the extruded shell during the extrusion process provides for superior bonding of the foam to the interior wall of the outer shell. This also provides for superior filling (avoiding voids) of the foam in the interior of the outer shell. Another advantage of this simultaneous injection of the liquid foam is that it minimizes the number of manufacturing steps or subsequent steps that have to be taken. This also tends to make the manufacture of the foam-filled extruded product very economical and requires a minimal amount of manufacturing floor space. The result is an economical, extremely strong final product.

The liquid foam is preferably polyurethane, but other materials such as polyesters and epoxies can be used as well. The outer polymer shell is preferably made from polyvinylchloride, but other materials such as acrylic, ABS, polyethylene, polypropylene, polycarbonate, and blends and alloys of two or more of these materials can be used. The polymer shell, once hardened, will preferably have a thickness ranging from 0.005 to 0.250 inches and the foam will preferably have a density ranging from 1 to 30 lbs/ft$^3$.

While the invention has been disclosed in preferred forms, it will be apparent to those skilled in the art that many additions, deletions, and modifications may be made therein without departing within the spirit and scope of the invention as set forth in the following claims:

What we claim is:

1. A process for fabricating an article having an inner rigid foam core and an outer resilient plastic shell, said article having a predetermined length and shape, said method comprising the steps of:

(a) extruding a thermoplastic material around a tube having a liquid foam material flowing therethrough;

(b) partially hardening the thermoplastic material while it is around the tube to form the outer resilient plastic shell;

(c) transporting the plastic shell over an opening formed in the tube and injecting liquid foam material into the plastic shell;

(d) transporting the plastic shell filled with the liquid foam material through a cooling and sizing tank whereby the liquid foam material is hardened to form the inner rigid foam core and the article comprising the inner rigid foam core and the outer resilient plastic shell is shaped into the predetermined shape;

(e) transporting the article out of the cooling and sizing tank; and (f) cutting the article to a predetermined length.

2. The process of claim 1 wherein the thermoplastic material is PVC.

3. The process of claim 1 wherein the liquid foam material is urethane.

4. The process of claim 1 wherein the method is a continuous method.

5. The process of claim 1 further comprising monitoring the shell to detect an absence of the shell adjacent the opening formed in the tube and halting the flow of the liquid foam material into the tube when the shell is absent adjacent the opening.

6. The process of claim 1 wherein the liquid foam material is polyester.

7. The process of claim 1 wherein the liquid foam material is epoxy.

* * * * *